Feb. 24, 1942.  H. S. OGDEN  2,274,379
CONTROL SYSTEM
Filed July 11, 1941
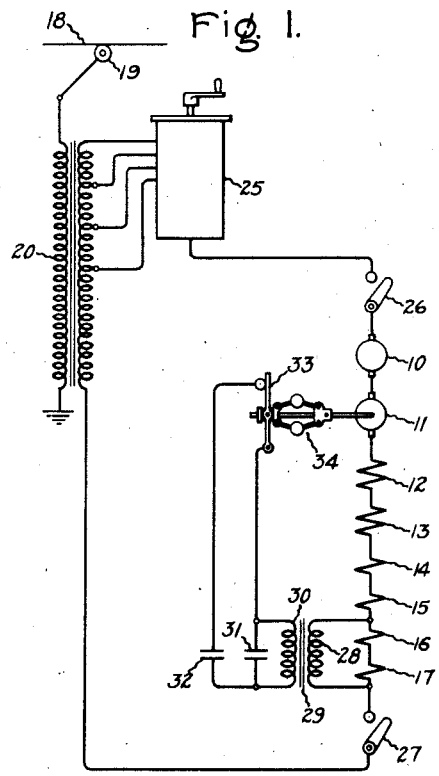
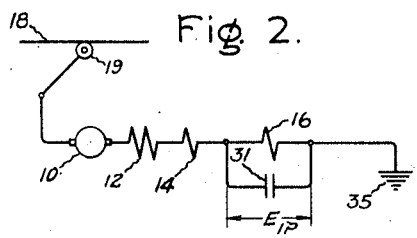
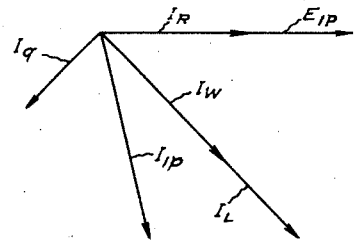
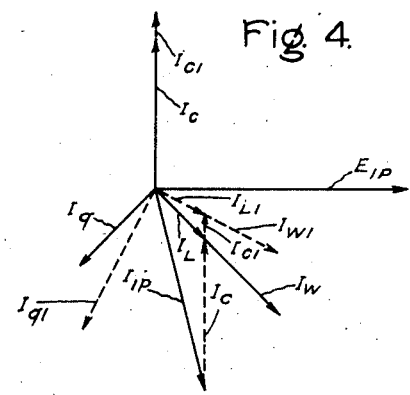
Inventor:
Harold S. Ogden,
by Harry E. Dunham.
His Attorney.

Patented Feb. 24, 1942

2,274,379

UNITED STATES PATENT OFFICE 2,274,379

CONTROL SYSTEM

Harold S. Ogden, Erie, Pa., assignor to General Electric Company, a corporation of New York Application July 11, 1941, Serial No. 401,981

10 Claims. (Cl. 171—228)

My invention relates to control systems and particularly to systems for controlling the operation of single phase alternating current series motors of the commutating type.

In commutating machinery it is customary to use brushes which are slightly wider than a single commutator bar, whereby during commutation two armature coils are short circuited while the brush rests on three adjacent commutator bars and one armature coil is short circuited whenever the brush rests upon two adjacent commutator bars. In either a direct current or an alternating current series connected commutating machine the current flowing in the armature winding sets up a flux displaced by substantially ninety degrees from the main field flux. The armature flux is called armature reaction and is in a position to generate a voltage by rotation in the short circuited turns being commutated. In an alternating current machine an additional voltage is generated in the short circuited turns by transformer action from the main field by virtue of the fact that the short circuited turns are positioned to enclose a part of the main field flux. In order to prevent sparking at the brushes during commutation it is necessary to compensate for or otherwise overcome the effect of the various voltages induced in the short circuited armature turns. For this purpose interpole field windings, located adjacent the short circuited armature turns have been used. The interpole winding itself is ordinarily highly inductive and heretofore has been shunted during motoring operation by a non-inductive resistor, whereby the current in the interpole field lags behind the line current by an angle substantially less than ninety electrical degrees. Thus the lagging interpole field current consists of a component in phase with the line current and a component which lags the line current by ninety degrees. The in-phase component of interpole field current sets up a flux opposing the armature reaction and provides a slight additional flux to assist in reversing the current through the coil being commutated. The component of interpole field current which lags ninety degrees behind the line current is referred to as the "quadrature" component and sets up a flux which lags the line current by ninety degrees. Since the voltage induced in the short circuited turns by the main field, called the transformed voltage, likewise lags the main field flux by substantially ninety degrees, the interpole field coil may be wound in such a direction that the quadrature flux, when cut by the rotation of the short circuited turns, will induce in the short circuited turns a compensating voltage opposing the transformed voltage.

As previously stated, it is known to obtain a quadrature component of interpole field flux by connecting in parallel with the interpole field winding a non-inductive shunting resistor. This method of connection is undesirable in that it produces a continuous loss of energy in the interpole field shunt. Where large amounts of power are involved, as in the traction motors of large main line locomotives, the use of a resistive interpole field shunt introduces further complications in that it is necessary to supply a special blower of substantial capacity for cooling the interpole field resistor.

One object of my invention, generally stated, is to improve the efficiency, simplify the construction and lower the cost of single phase alternating current series motors without sacrifice of any of its essential characteristics.

It is a further object of my invention to improve the efficiency of an alternating current series motor of the commutating type by reducing to a negligible value the continuous energy loss in the interpole field circuit.

It is a still further object of my invention to provide an interpole field circuit for an alternating current series motor of the commutating type which shall greatly improve the ratio of interpole field current to armature current.

According to my invention the above and other objects are attained by connecting across all or part of the interpole field winding a shunt consisting of a capacitive impedance. As will appear more fully hereinafter, this arrangement, when compared with a resistive interpole shunt circuit, provides approximately four times the value of interpole field current for any predetermined armature current, or conversely will provide a predetermined interpole field current with only one fourth the previously necessary armature current flowing. Furthermore, the increase in interpole current for any predetermined armature current is attained through the practice of my invention, without any substantial change in the phase displacement of the armature current and interpole field current. Due to the increase in the ratio of interpole field current to the armature current, only approximately one fourth the number of turns are necessary in the interpole field winding as were previously required, whereby the construction of the motor is simplified and its cost reduced without sacrifice of quality. Considerable savings in operating costs will also result from the fact that the continuous energy loss in the capacitor is negligible in comparison with the continuous loss heretofore sustained in a resistive shunt.

For a better understanding of my invention itself and for a further appreciation of its many objects and advantages reference should now be had to the following detailed specification taken in conjunction with the accompanying drawing in which Fig. 1 is a schematic circuit diagram of connections for a control system embodying my invention; Fig. 2 is a simplified circuit diagram of connections for a single phase alternating current series motor embodying my invention in a modified form; Fig. 3 is a vector diagram illustrating certain conditions of operation for a single phase alternating current series motor having a resistive interpole shunt; and Fig. 4 is a vector diagram illustrating the same conditions of operation for a single phase alternating current series motor connected in accordance with my invention. Corresponding parts of the various figures have been assigned like reference numerals.

In Fig. 1 I have shown my invention applied to an electric vehicle traction system comprising a pair of single phase alternating current series motors 10 and 11 having main series field windings 12 and 13, series connected compensating windings 14 and 15, and series connected interpole field windings 16 and 17, respectively. As illustrated, energy is supplied to the motors 10 and 11 from a single phase source of alternating current supply 18 through a trolley 19 and a power transformer 20. For motoring operation the motors 10 and 11 may be connected to the secondary winding of the power transformer 20 through a voltage controller 25 and a pair of motoring switches 26 and 27. While I have shown the switches 26 and 27 as manually operable, it will of course be understood that, if desired, these switches may be controlled by any suitable control system many of which are well known to those skilled in the art. Furthermore, I wish to have it understood that, while I have shown a pair of series connected traction motors, my invention is not limited in its scope to traction motor systems nor to two motors operating in series circuit relation, but any desired number of motors driving any type of load and connected in any desired combination of series or parallel may be provided with my invention.

In order to supply a quadrature component of interpole field current, I connect the primary winding 28 of a current transformer 29 in parallel circuit relation with the interpole field windings 16 and 17 and connect the secondary winding 30 of the transformer 29 permanently across a capacitor 31. While it is desirable because of the relatively high current flowing in the main power circuit to use the current transformer 29 for energizing the capacitor 31, such an arrangement is not essential to the practice of my invention. It will be understood that although capacitors of smaller size may be used in connection with the transformer, large capacitors may, if desired, be connected directly in parallel with the interpole field windings 16 and 17 with the same advantageous result.

In order to compensate for changes in motor speed, I have shown a second capacitor 32 arranged for connection in parallel with the capacitor 31 through a switch 33. It will be recalled that the transformed voltage generated in the short circuited turns being commutated depends in magnitude upon the frequency and magnitude of the line current and is therefore constant for any predetermined line current on a constant frequency system. On the other hand, the compensating voltage, which opposes the transformed voltage, is generated by rotation of the short circuited turns through the quadrature field set up by the commutating pole. This compensating voltage therefore depends in magnitude upon the speed of rotation of the armature and the magnitude of the quadrature component of interpole field flux. Therefore, as the armature speed decreases, and if any predetermined line current is maintained, it is necessary to increase the quadrature component of interpole field flux in order to provide sufficient compensating voltage to overcome the transformed voltage of the short circuited coil. In order to accomplish this result automatically, a speed responsive switching mechanism 34 may be arranged to open the switch 33 as the armature speed increases.

I wish to have it understood that I have shown a single speed controlled capacitor 32 by way of example only, and that any desired number of such capacitors may be connected in parallel with the permanently connected capacitor 31 by means of suitable control switches. In the event that a plurality of speed controlled capacitors are provided it will be understood that the speed responsive switches will be sequentially operable in response to increasing or decreasing armature speed.

The principle upon which my invention is based will be more fully understood by referring now to Figs. 2, 3 and 4. Fig. 2 is a simplified circuit diagram showing the motor 10 of Fig. 1 connected between the single phase source of alternating current supply 18 and a ground connection 35. The interpole field winding 16 of the motor 10 has connected directly in parallel therewith the capacitor 31.

By way of comparison the vector diagram on Fig. 3 shows the relation of the various components of interpole field current and the line current in the case where a non-inductive resistor is connected across the interpole field winding 16 in place of the capacitor 31. The voltage across the interpole field 16 may be represented by a vector $E_{ip}$. Since the interpole field winding 16 is predominantly inductive, the current flowing through this winding may be represented by a vector $I_{ip}$ which lags the voltage $E_{ip}$ by nearly ninety electrical degrees. The current flowing through the assumed non-inductive shunting resistor may be represented by a vector $I_r$ which is in phase with the voltage $E_{ip}$ across the resistor. The vector sum of $I_r$ and $I_{ip}$ is equal to the line current $I_L$. For the purpose of analysis the interpole field current $I_{ip}$ may now be resolved into a component $I_w$ which is in phase with the line current $I_L$ and a quadrature component $I_q$ which lags the line current by ninety electrical degrees.

Referring now to Fig. 4, the vector diagram of this figure represents the relation between the interpole field current and the line current for the capacitive shunt circuit connections of Figs. 1 and 2. In this case it may be assumed that the same voltage $E_{ip}$ exists across the interpole field winding 16. As before, this voltage will set up an interpole field current $I_{ip}$ which lags the voltage $E_{ip}$ by nearly ninety electrical degrees. In this case however a current $I_c$ which leads the voltage $E_{ip}$ by ninety electrical degrees will flow through the capacitor 31, and the vector sum of $I_{ip}$ and $I_c$ will be equal to the line current $I_L$. If now the interpole field current $I_{ip}$ is resolved into its components $I_w$ and $I_q$, it will be observed that in order to obtain substantially the same components of interpole field current as at Fig. 3 the line current is of approximately only one-fourth the magnitude of the line current indicated at Fig. 3 and has substantially the same phase relation to the interpole field current $I_{ip}$. Conversely, it may be said that with the capacitor shunt illustrated at Figs. 1 and 2 the interpole field current will be magnified approximately fourfold if the same line current is maintained.

To illustrate the effect of the speed controlled capacitor 32 I have shown in broken lines at Fig. 4 a second vector diagram of current relations under low speed conditions where the capacitor 32 is connected in parallel with the capacitor 31. Under these conditions the capacitor current $I_c$ will be increased to a value $I_{c1}$, which, when combined with the interpole field current $I_{ip}$ will produce a resultant line current $I_{L1}$. If the interpole field current $I_{ip}$ is now resolved into its in-phase component $I_{w1}$ and quadrature component $I_{q1}$, it will be observed that for a very slight change in the magnitude of the line current the quadrature component of the interpole field current has been substantially increased in magnitude. As previously stated, the increased magnitude of the quadrature component of interpole field current compensates for the reduced armature speed.

While I have illustrated certain embodiments of my invention by way of illustration, many other modifications will undoubtedly occur to those skilled in the art, and I therefore wish to have it understood that I intend by the appended claims to cover all such modifications as fall within the true spirit and scope of my invention.

What I claim as new and desire to secure by Letters Patent of the United States, is:

1. In combination, an alternating current single phase commutator motor having an armature and a series field winding, an interpole field winding for said motor connected in series circuit relation with said armature, means for connecting said motor to a source of electric supply, and shunting means for at least a portion of said interpole field winding arranged to displace the current in said interpole field winding with respect to the phase of the current in said armature, said shunting means consisting only of a capacitive impedance.

2. In combination, an alternating current single phase commutator motor having an armature and a series field winding, an interpole field winding for said motor connected in series circuit relation with said armature, means for connecting said motor to a source of electric supply, shunting means for at least a portion of said interpole field winding arranged to displace the current in said interpole field winding with respect to the phase of the current in said armature, said shunting means consisting of a capacitive impedance, and means for varying the shunting effect of said capacitive impedance in response to the speed of said motor.

3. In combination, an alternating current single phase commutator motor having an armature and a series field winding, an interpole field winding for said motor connected in series circuit relation with said armature, means for connecting said motor to a source of electric supply, shunting means for said interpole field winding arranged to displace the current in said interpole field winding with respect to the phase of the current in said armature, said shunting means consisting of a capacitive impedance, and speed responsive means arranged to vary the value of said capacitive impedance thereby to vary the phase and magnitude of the quadrature component of said interpole field current with respect to said armature current.

4. In combination, an alternating current single phase commutator motor having an armature and a series field winding, an interpole field winding for said motor connected in series circuit relation with said armature, means for connecting said motor to a source of electric supply, a plurality of capacitors, and switching means responsive to the speed of said motor for controlling the connection of said capacitors in parallel circuit relation with said interpole field winding thereby selectably to provide a quadrature component of current in said interpole field winding with respect to the current in said armature.

5. In combination, an alternating current single phase commutator motor having an armature and a series field winding, an interpole field winding for said motor connected in series circuit relation with said armature, means for connecting said motor to a source of electric supply, a plurality of capacitors, and speed responsive switching means for sequentially connecting said capacitors in parallel circuit relation with said interpole field thereby selectably to provide a quadrature component of current in said interpole field winding with respect to the current in said armature.

6. In combination, an alternating current single phase commutator motor having an armature and a series field winding, an interpole field winding for said motor connected in series circuit relation with said armature, means for connecting said motor to a source of electric supply, transformer means having a primary winding permanently connected to constitute a shunt circuit for said interpole field winding, and a secondary circuit for said transformer means consisting only of a variable capacitive impedance.

7. In combination, an alternating current single phase commutator motor having an armature and a series field winding, an interpole field winding for said motor connected in series circuit relation with said armature, means for connecting said motor to a source of electric supply, transformer means having a primary winding connected in parallel circuit relation with said interpole field winding, a secondary circuit for said transformer consisting of a capacitive impedance, and switching means responsive to the speed of said motor for controlling the valve of said capacitive impedance thereby selectably to provide a quadrature component of current in said interpole field winding with respect to the current in said armature.

8. In combination, an alternating current single phase commutator motor having an armature and a series field winding, an interpole field winding for said motor connected in series circuit relation with said armature, means for connecting said motor to a source of electric supply, and shunting means connected in parallel circuit relation with said interpole field winding to provide a component for said interpole field current which lags the current in said armature by substantially ninety electrical degrees, said shunting means consisting only of a capacitive impedance.

9. In combination, an alternating current single phase commutator motor having an armature and a series field winding, an interpole field winding for said motor connected in series circuit relation with said armature, means for connecting said motor to a source of electric supply, a plurality of capacitors, means for connecting at least one of said capacitors permanently in parallel circuit relation with said interpole field winding thereby to provide a quadrature component of interpole field current with respect to the current in said armature, and speed responsive switching means arranged sequentially to connect the remainder of said capacitors in parallel circuit relation with said interpole field winding as the speed of said motor decreases.

10. In combination, an alternating current single phase commutator motor having an armature and a series field winding, an interpole field winding for said motor connected in series circuit relation with said armature, means for connecting said motor to a source of electric supply, transformer means having a primary winding connected in parallel circuit relation with said interpole field winding, a plurality of capacitors, means for connecting at least one of said capacitors permanently across the secondary winding of said transformer thereby to provide in said interpole field winding a quadrature component of current with respect to the current in said armature, and switching means responsive to the speed of said motor for sequentially connecting the remainder of said capacitors across said secondary winding as the speed of said motor decreases.

HAROLD S. OGDEN.